(12) United States Patent
Majmundar et al.

(10) Patent No.: US 9,084,176 B2
(45) Date of Patent: Jul. 14, 2015

(54) LONG TERM EVOLUTION NETWORK ADMISSION MANAGEMENT

(75) Inventors: Milap V. Majmundar, Austin, TX (US); Venson M. Shaw, Kirkland, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 35 days.

(21) Appl. No.: 13/537,997

(22) Filed: Jun. 29, 2012

(65) Prior Publication Data

US 2014/0003337 A1   Jan. 2, 2014

(51) Int. Cl.
| | |
|---|---|
| H04W 8/04 | (2009.01) |
| H04W 88/06 | (2009.01) |
| H04W 28/06 | (2009.01) |
| H04W 72/04 | (2009.01) |
| H04L 12/875 | (2013.01) |
| H04L 12/861 | (2013.01) |
| H04W 48/06 | (2009.01) |
| H04W 8/18 | (2009.01) |

(52) U.S. Cl.
CPC ............... *H04W 48/06* (2013.01); *H04W 8/18* (2013.01)

(58) Field of Classification Search
CPC ..... H04W 80/04; H04W 88/06; H04W 28/04; H04W 72/04; H04L 47/56; H04L 49/90
USPC ................... 370/328, 329, 229, 230
See application file for complete search history.

(56) References Cited

U.S. PATENT DOCUMENTS

2011/0194406 A1\* 8/2011 Ye et al. .................. 370/225
2012/0170552 A1\* 7/2012 Oprescu-Surcobe et al. 370/332

FOREIGN PATENT DOCUMENTS

WO   WO 2011/1560615   \* 12/2011   ............ H04W 72/08
WO   WO 2012076065    \*  6/2012   ............. H04L 29/06

\* cited by examiner

*Primary Examiner* — Ronald B Abelson
(74) *Attorney, Agent, or Firm* — Baker & Hostetler LLP

(57) ABSTRACT

A core network device may be configured to work with a radio access network device to determine whether to allow access to a network. Criteria that may be used to make the determination include the condition of devices and links within the core network and the radio access network, which may be determined by data received from other devices at the core network device. In another embodiment, the type of service requested, for example whether the request is for an IMS service or non-IMS service, may be used to evaluate whether the a request for access to the network should be permitted.

20 Claims, 11 Drawing Sheets

100

LONG TERM EVOLUTION NETWORK ADMISSION MANAGEMENT

TECHNICAL FIELD

The technical field generally relates to wireless communications and more specifically relates to managing admission of, and provision of services for, mobile devices in long term evolution (LTE) networks.

BACKGROUND

In current wireless networks, such as long term evolution (LTE) networks, edge network elements such as radio access network (RAN) elements determine whether user wireless device are granted access to the network. In an LTE example, admission control is performed at the eNode-B (i.e., base station) based on allocation and retention priority (ARP) information that is stored in the home subscriber server (HSS) and transmitted to the eNodeB from a mobility management entity (MME). ARP information consists of a priority value, a pre-emption capability indication (PCI), and a pre-emption vulnerability indicator (PVI). While ARP information is stored and transmitted to an edge device from a core network device, the decisions regarding access to the network are determined at the edge device (e.g., eNode-B). Core devices, such as the MME, do not actively participate in determining whether a user mobile device is permitted to attach to the network. Edge devices typically use only radio interference and congestion levels to determine whether to permit a mobile device to connect to an edge device. Such an admission system fails to account for potentially overloaded elements in the core network.

LTE networks include an IP multimedia subsystem (IMS) that is configured to handle voice services and other services for end user mobile devices by using standard IP protocols. However, devices using a network may use services or access other devices that are not accessible through the IMS. Moreover, some devices that connect to a network may not be capable of communicating with the IMS. Current networks are not capable of distinguishing between mobile devices that are IMS capable and those that are not. Therefore, such networks do not determine whether the network should accept or reject the mobile device's traffic based on the device's IMS capability. Therefore, the IMS character of traffic on the network is not fully utilized to address adverse network conditions such as congestion and overload.

SUMMARY

A core network device may be configured to work with a radio access network device to determine whether to allow access to a network. In an embodiment, an MME may determine network conditions in a core network and/or a radio access network and determine, based on the determined conditions and the condition of the eNode-B receiving a request for access from a mobile device, whether the request for access to the network should be granted. Criteria that may be used to make the determination of whether to grant admission include the condition of devices and links within the core network and within the radio access network. The MME may receive such data from other devices in the network periodically, as needed (e.g., when condition are abnormal) or in response to polling.

In another embodiment, the type of service requested may be used to evaluate whether a request from a mobile device for access to the network should be permitted. For example, a device within the network, such as a PDN GW, may determine whether the device requesting service is IMS capable or not. If the device is IMS capable, the PDN GW may evaluate the state of the IMS and the resources needed to provide traffic to the IMS. If the device is not IMS capable, the PDN GW may evaluate the state of non-IMS resources. The PDN GW may then determine whether the mobile device should be permitted to access the requested portion of the network. These and other aspects of the present disclosure are set forth in more detail below and in the figures.

BRIEF DESCRIPTION OF THE DRAWINGS

The following detailed description of preferred embodiments is better understood when read in conjunction with the appended drawings. For the purposes of illustration, there is shown in the drawings exemplary embodiments; however, the subject matter is not limited to the specific elements and instrumentalities disclosed. In the drawings.

DETAILED DESCRIPTION OF ILLUSTRATIVE EMBODIMENTS

Figure 1A:
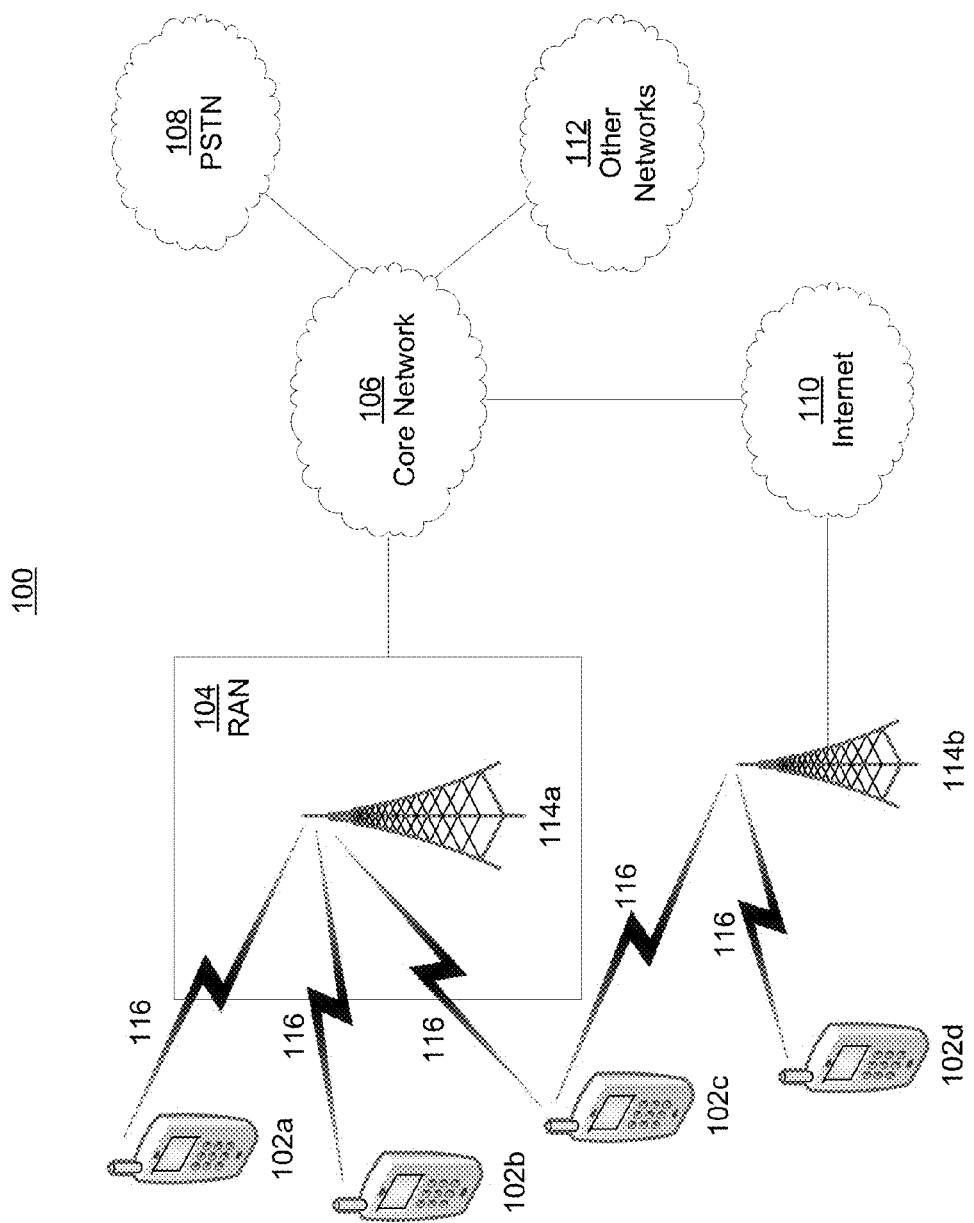
FIG. 1A is a system diagram of an example communications system in which admission management may be implemented.

FIG. 1A is a diagram of an example communications system 100 in which admission management systems and methods may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. A communications system such as that shown in FIG. 1A may also be referred to herein as a network.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a mobile device, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA) that may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA20001x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
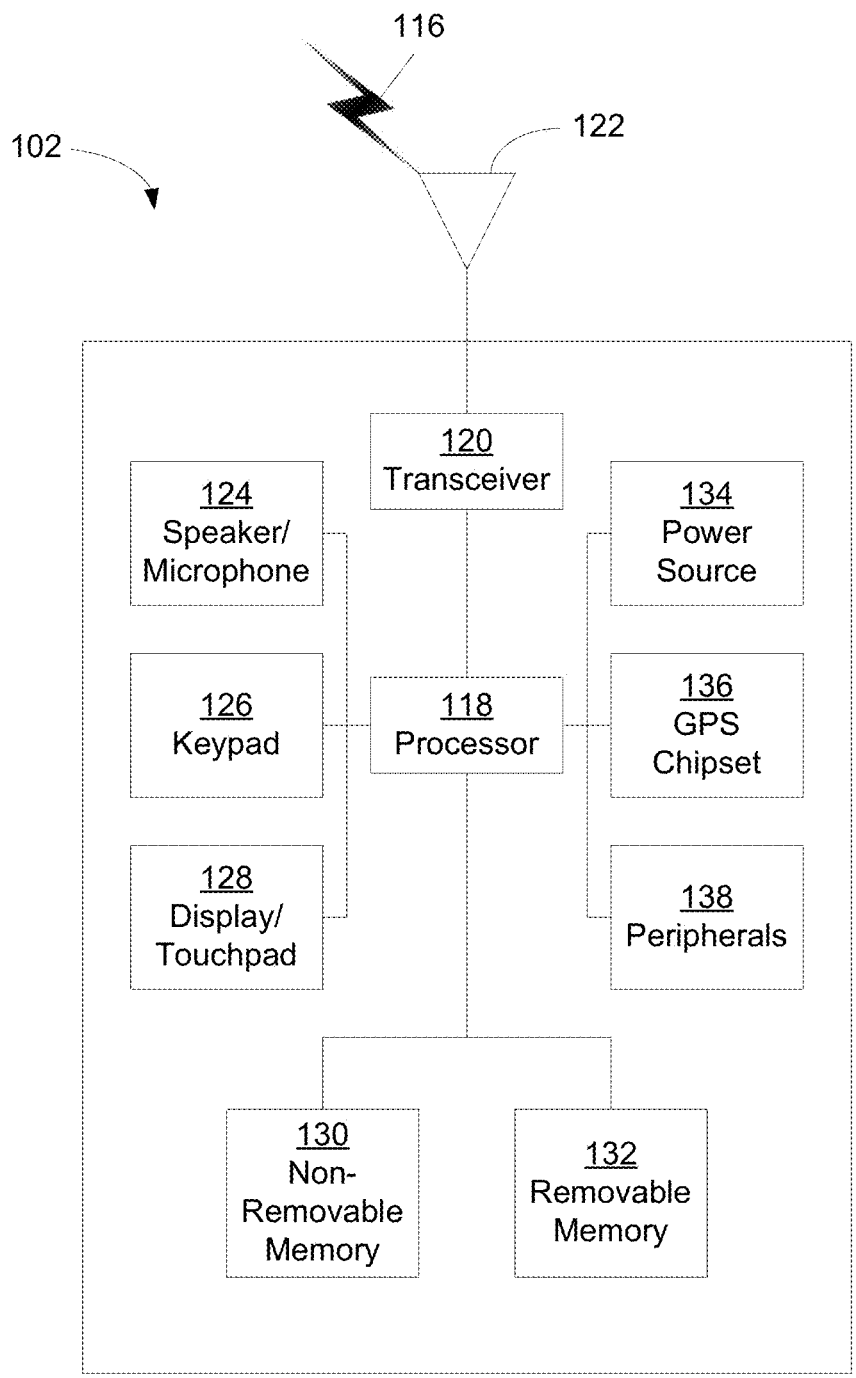
FIG. 1B is a system diagram of an example mobile device (also referred to as a wireless transmit/receive unit (WTRU) and/or as user equipment (UE)) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
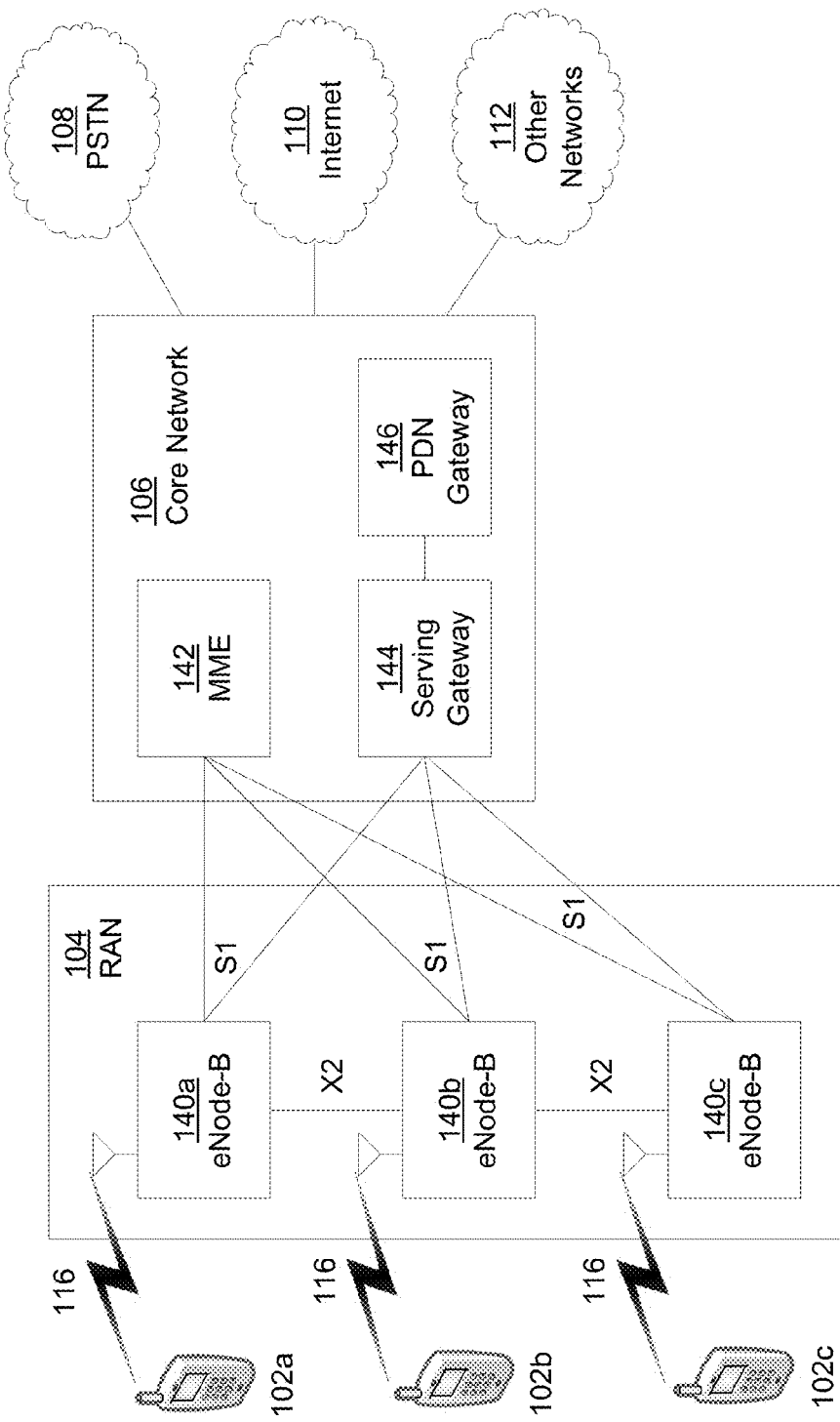
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, and 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, and 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway or entity (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode-Bs 140a, 140b, and 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Figure 2:
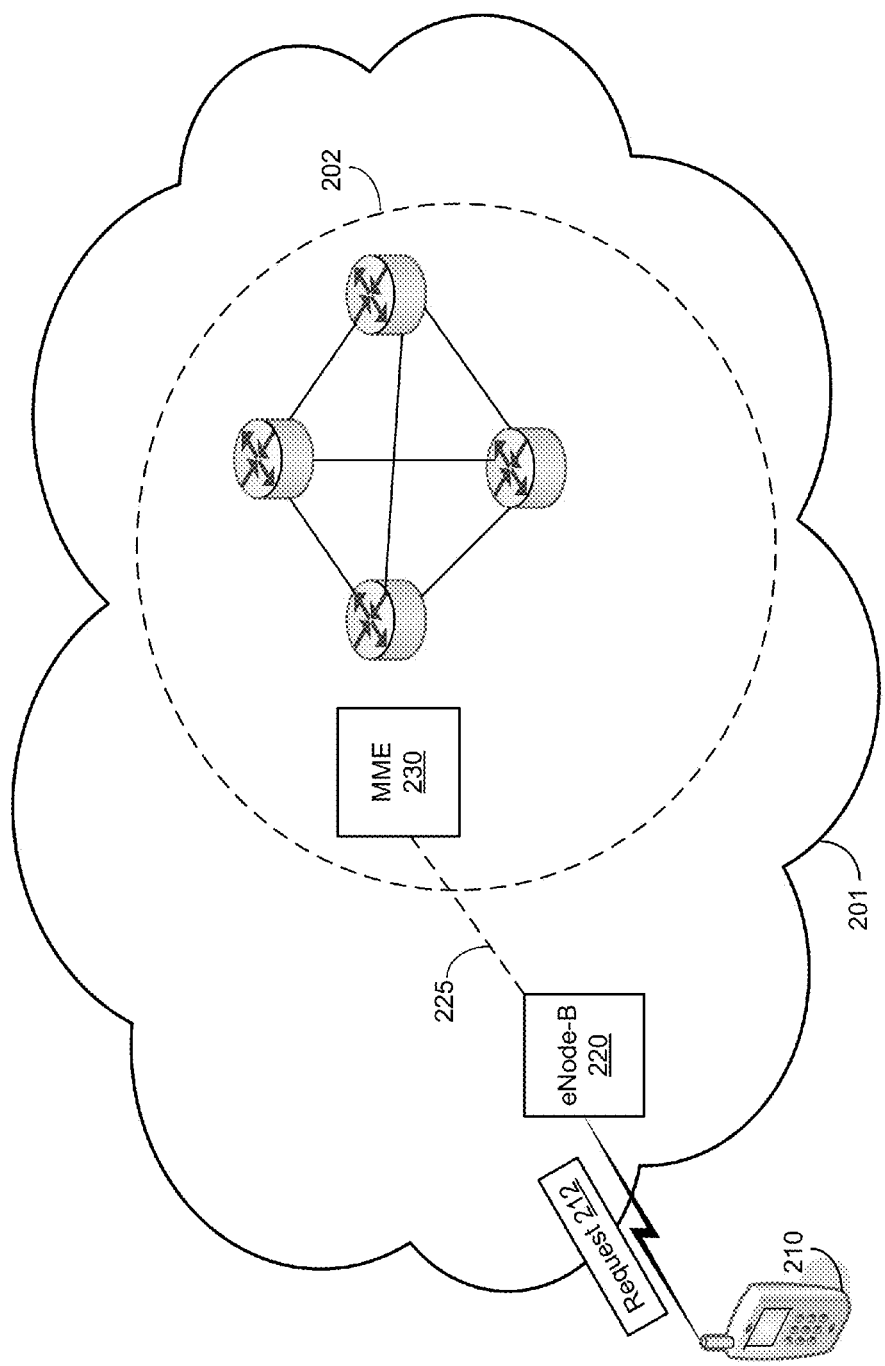
FIG. 2 illustrates a non-limiting exemplary network configuration in which admission management may be implemented.

FIG. 2 illustrates an exemplary network configuration and signal flow that may be used in an embodiment. Mobile device 210, in an embodiment operated by a customer of a provider of network 201, may transmit request 212 to establish communications with network 201 to eNode-B 220. Request 212 may be a bearer request or any type of request to attach to, connect to, be admitted to, or otherwise establish communications with network 201. Mobile device 210 may be any type of wireless communications device, including a UE, a WTRU, or any other communications device as disclosed herein, or any other type of device capable of being configured to perform the functions and features of the present disclosure. Network 201 may be any type of communications network, including a wireless network, a wired network, and a combination thereof, implementing any number and type of communications protocols and technologies. eNode-B 220 may be in RAN 203 portion of network 201 and may be any type of eNode-B, or any other type of radio access network device or edge device, and represents any device capable of performing the functions and activities described herein. RAN 303 may include any other network elements. All such embodiments are contemplated as within the scope of the present disclosure.

In an embodiment, eNode-B 220 may operate in conjunction with a core network element in jointly determining admission control for mobile device 210. For example, MME 230 may work with eNode-B 220 (in an embodiment, via link 225 that may be either a logical link, a physical link, or any combination thereof) to determine whether mobile device 210 is permitted to attach to network 201 at eNode-B 220 by utilizing data that provides a status of the overall network or a larger portion of the network than merely the status of eNode-B 220. For example, MME 230 may take into account a status of the radio access network and/or packet core network 202. Packet core network 202 may include any number and types of devices and interconnections that may be configured in a packet core network. MME 230 may communicate with any number and type of devices configured in packet core 202 (connections not shown in FIG. 2). In an LTE enhanced packet core (EPC) embodiment, multi-level admission control may be used where MME 230 determines whether a new bearer can be admitted based on core network congestion status and/or condition. This information may be used in conjunction with the determination by MME 230 and/or eNode-B 220 of whether eNode-B 220 can support an additional bearer and/or attached device. The final determination of whether to admit mobile device 210 may be made based on the combination of core congestion and eNode-B 220 availability by either eNode-B 220 or MME 230, and communicated accordingly between these two devices and any other devices as needed to allow or reject admission of mobile device 210 via eNode-B 220.

In an embodiment, MME 230 may collaborate with other EPC core network elements, which may include one or more of an S-Gateway (SGW), a P-Gateway (PGW), and a policy and charging rules function (PCRF), in order to determine a more comprehensive view of the condition of network 201 and overall congestion status. In such an embodiment, MME 230 may periodically communicate using general packet radio service (GPRS) tunneling protocol (GTP) and/or DIAMETER protocol with the surrounding networks elements, such as those elements in core network 202, and receive updated network status, congestion, and/or condition data. MME 230 may also send periodic queries to eNode-B 220 and/or to other RAN elements of RAN 203 or any other RAN portion of network 201 to request RAN status, congestion, and/or condition data. Alternatively, or in addition, any core network elements and RAN elements of network 201 may be configured to periodically report status, congestion, and/or condition data and/or to report status, congestion, and/or condition data when such status, congestion, and/or condition data indicates an exceptional or service impacting status, congestion, and/or condition. Any data may be exchanged with and/or provided to MME 230. This data may be used in conjunction with the determination by MME 230 and/or eNode-B 220 of whether eNode-B 220 can support an additional bearer and/or attached device. The final determination of whether to admit mobile device 210 may be made based on the combination of this data and eNode-B 220 availability by either eNode-B 220 or MME 230, and communicated accordingly between these two devices and any other devices as needed to allow or reject admission of mobile device 210 via eNode-B 220.

Note that any combination of devices and data from such devices related to any status, congestion, and/or condition of any network element, network portion, or entire network may be used to determine admission control. For example, eNode-B 220 may use status, congestion, and/or condition data from one or more devices of core network 202 to determine whether to admit mobile device 210. Alternatively, MME 230 may use data from several RAN devices, including eNode-B 220, to determine if eNode-B 220 should admit mobile device 210. For example, MME 230 may determine that, while eNode-B is not overly congested, another eNode-B proximate to mobile device 210 may be even less congested and a better candidate for servicing mobile device 210. All such embodiments, and any permutations thereof, are contemplated as within the scope of the present disclosure.

Figure 3:
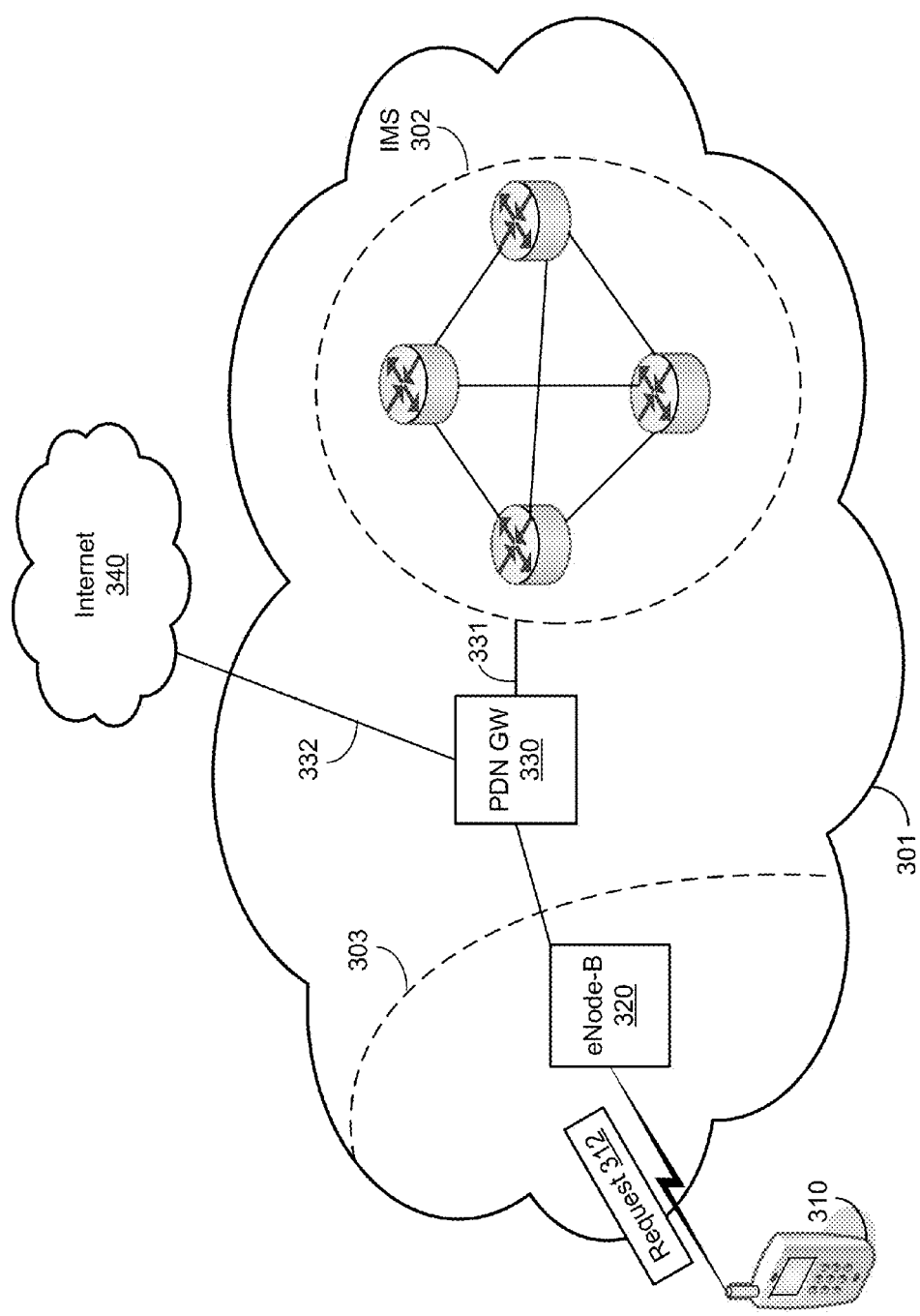
FIG. 3 illustrates another non-limiting exemplary network configuration in which admission management may be implemented.

FIG. 3 illustrates another exemplary network configuration and signal flow that may be used in an embodiment. Mobile device 310, in an embodiment operated by a customer of a provider of network 301, may transmit request 312 to establish communications with network 301 to eNode-B 320. Request 312 may be a bearer request or any type of request to attach to, connect to, be admitted to, or otherwise establish communications with network 301. Mobile device 310 may be any type of wireless communications device, including a UE, a WTRU, or any other communications device as disclosed herein, or any other type of device capable of being configured to perform the functions and features of the present disclosure. Network 301 may be any type of communications network, including a wireless network, a wired network, and a combination thereof, implementing any number and type of communications protocols and technologies. eNode-B 320 may be in RAN 303 portion of network 301 and may be any type of eNode-B, or any other type of radio access network device or edge device, and represents any device capable of performing the functions and activities described herein. RAN 303 may include any other network elements. All such embodiments are contemplated as within the scope of the present disclosure.

Network 301 may include packet data network (PDN) gateway (GW) 330 that may determine whether traffic transmitted by mobile device 310 is to be relayed to IP multimedia subsystem (IMS) 302 of network 301, or to Internet 340. IMS 302 may be any number and type of devices, systems, and subsystems (e.g., application servers) that provide multimedia services to user devices communicating with network 301. Services provided by IMS 302 may include VoIP services, presence-based services, and any other multimedia services. PDN GW 330 may be any device or number of devices of any type that determines whether user traffic is to be routed to IMS 302, to Internet 340, or to any other network, system, or device. PDN GW may be configured in an EPC of network 301.

A user of mobile device 310, when using mobile device 310 to access Internet 340, may not interact or have any traffic that traverses or is otherwise affected by IMS 302. Similarly, when mobile device 310 is being used to access services provide by or via IMS 302, such traffic may not interact or have any traffic that traverses or is otherwise affected by Internet 340. Note that some user devices may not be capable of using the services offered by IMS 302, and may therefore never interact or have any traffic that traverses or is otherwise affected by IMS 302. Therefore, the traffic generated and received by mobile device 310, and any other mobile device attached to or otherwise communicating with network 301, may be categorized generally as IMS traffic or non-IMS traffic.

In an embodiment, request 312 may be an IMS traffic request or a non-IMS traffic request. PDN GW 330 may determine congestion, device condition, and status data for itself and/or the links that connect PDN GW to RAN 303, Internet 340, and/or IMS 302. Using this data, PDN GW 330 may determine or contribute data for the determination of whether request 312 is to be granted. For example, upon determining that request 312 is an IMS request, eNode-B may query PDN GW 330 as to access conditions for IMS 302. PDN GW 330 may respond with data indicating that it and/or one or more links to IMS 302 are congested or otherwise unable to properly provide IMS services to mobile device 310. eNode-B may use this data to reject request 312 and/or to divert request 312 to an alternate IMS. Alternatively, should PDN GW 330 provide data indicating that it and/or the links to IMS 302 are uncongested or otherwise are able to properly provide IMS services to mobile device 310, request 312 may be accepted and access to IMS 302 may be provided.

Similarly, upon determining that request 312 is a non-IMS request, for example, an Internet traffic request, eNode-B may query PDN GW 330 as to access conditions for Internet 340. PDN GW 330 may respond with data indicating that it and/or one or more links to Internet 340 are congested or otherwise unable to properly provide Internet access to mobile device 310. eNode-B may use this data to reject request 312 and/or to divert request 312 to an alternate path to Internet 340. Alternatively, should PDN GW 330 provide data indicating that it and/or the links to Internet 340 are uncongested or otherwise are able to properly provide Internet access to mobile device 310, request 312 may be accepted and access to Internet 340 may be provided. Similar steps may be taken in the process of accepting or rejecting requests for access to other non-IMS services or systems.

When determining whether to grant access to IMS 302 or Internet 340, thresholds may be used. For example, if link 331 or link 332, connecting PDN GW 330 to IMS 302 and Internet 340, respectively, is carrying above a threshold of traffic, or is at or above a percentage of utilization (e.g., 50%, 75%, etc.), requests for access to the respective network resource may be denied.

In an embodiment, one or more devices within network 301, such as eNode-B 310 or PDN GW 330, may determine whether request 312 is for IMS traffic or non-IMS traffic. This determination may be made based on the actual service requested by request 312 that indicated user desired-service or user behavior. For example, request 312 may be a request to place a VoIP telephone call. Alternatively, this determination may be made based on the capabilities of mobile device 310. For example, eNode-B 310, PDN GW 330, or some other network device may determine a device identifier (e.g., international mobile equipment identity (IMEI)) for mobile device 310 from request 312, and then determine whether the identifier is associated with an IMS capable device. Alternatively, in response to receiving request 312 where request 312 may be a network attach and/or bearer request, eNode-B 320 (or another RAN device) may transmit a request to mobile device 310 requesting information about its radio capabilities. Alternatively, or in addition, in order to initiate an IMS-based service, mobile device 210 may perform an IMS registration with an IMS domain associated with IMS 302. When the IMS registration for mobile device 310 is successful, the IMS domain may have information about the IMS-capability of mobile device 310. Network 301 may be configured to maintain device capability information for mobile device 310 and other devices that may communicate with network 310.

If mobile device 310 is determined to be IMS capable, IMS conditions and congestion data may be used to determine if request 312 is accepted or rejected. If mobile device 310 is determined to not be IMS capable, then IMS conditions and congestion data may not be used to determine if request 312 is accepted or rejected. In this case, any other data may still be used to determine whether to accept or reject request 312, including data regarding congestion and conditions for Internet 340 and any other data. The final determination of whether to accept or reject request 312 may be performed, using any data, by any device within network 301, including PDN GW 330 and eNode-B 320, and communications necessary to reject or accept request 312 may be transmitted to any device(s) as needed to convey and/or implement the acceptance or rejection. All such embodiments are contemplated as within the scope of the present disclosure.

Figure 4:
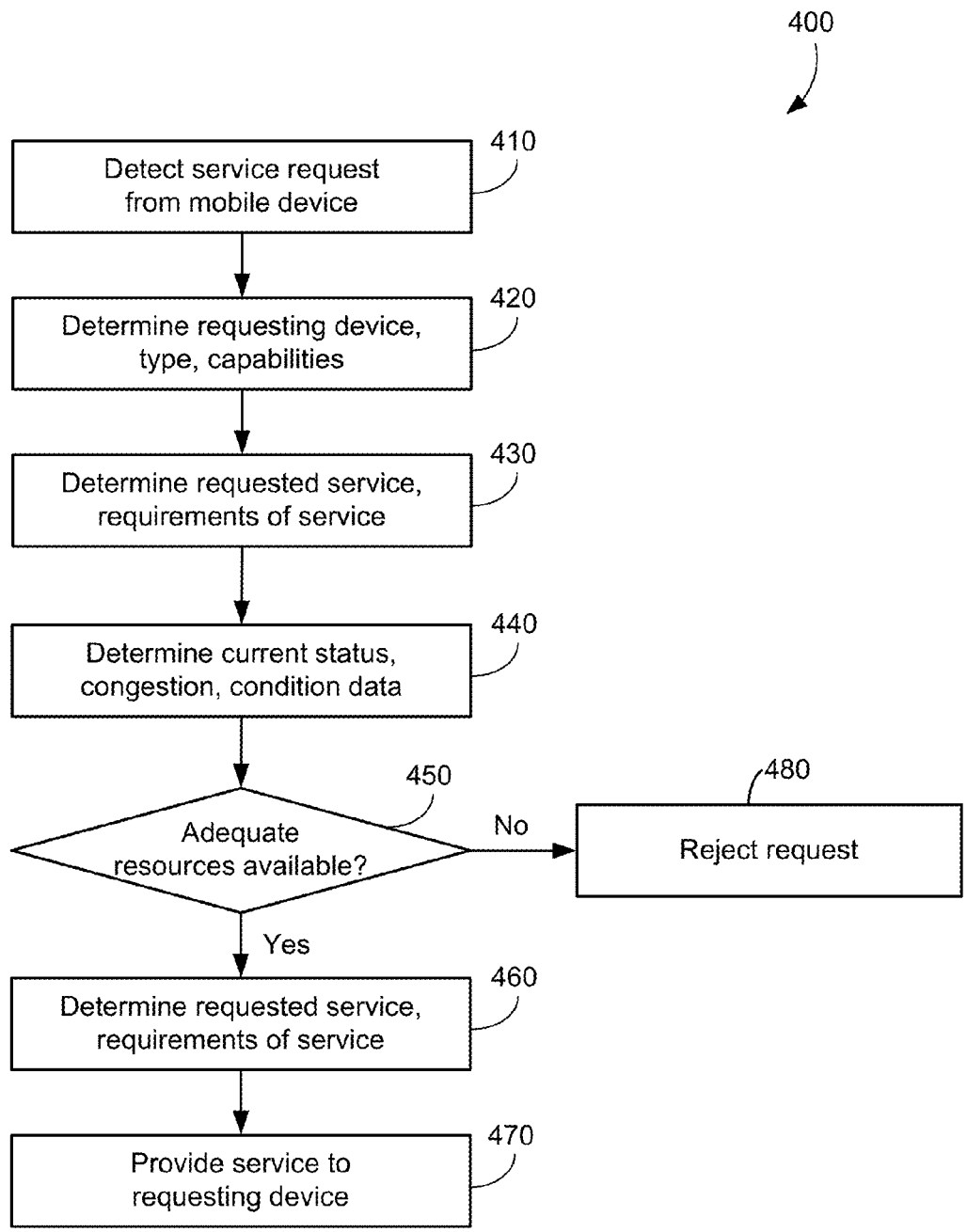
FIG. 4 illustrates another non-limiting exemplary method of implementing an embodiment of admission management.

FIG. 4 illustrates exemplary, non-limiting method 400 of implementing an embodiment as disclosed herein. Method 400, and the individual actions and functions described in method 400, may be performed by any one or more devices, including those described herein. In an embodiment, method 400 may be performed by a RAN element and/or a core network element, and/or software configured and/or executing on any network element. Note that any of the functions and/or actions described in regard to any of the blocks of method 400 may be performed in any order, in isolation, with a subset of other functions and/or actions described in regard to any of the other blocks of method 400 or any other method described herein, and in combination with other functions and/or actions, including those described herein and those not set forth herein. All such embodiments are contemplated as within the scope of the present disclosure.

At block 410, a network bearer request, network attach request, or other request for network service transmitted by a mobile device may be received and/or detected by a network element. At block 420, the source of the request (i.e., the requesting device) and characteristics thereof may be determined. This may include determining a device identifier (e.g., IMEI), a device type, and/or device capabilities (e.g., IMS or non-IMS capable) using any means, including querying databases and other stores of information that may be used to determine such information. At block 430 the requested service or other characteristic of the request may be determined so that the traffic capacity and resources required to properly provide the service may be determined. At block 440, current network and/or network element status, congestion, and/or conditions may be determined. Such information may be determined from data received in response to queries or polling, data collected via updates transmitted from devices reporting the data, or any other data collected and/or obtained using any means or methods. Such information may include determining, based on obtained data, current usage and/or demand for services and/or the links and/or devices that facilitate providing such services. For example, current congestion and utilization of devices and/or links that may be used to provide an IMS or non-IMS service may be determined.

At block 450, a determination may be made as to whether the requested service is to be provided or otherwise permitted to continue based on the current conditions in the network and the requirements of the requested service. If the requested service is to be provided, at block 460 resources may be assigned to the requesting device and/or for the requested service. This may include assigning and/or provisioning one or more bearers, assigning traffic allocation for the particular type of traffic and/or requesting device. Quality of service parameters may also be set for the service requested and/or the requesting device. For example, the requesting device may be determined to be high capability device, a mid-range device, or a low capability device. Alternatively, or in addition, service requirements may be determined for the particular service requested (e.g., real time gaming, browsing, VoIP, etc. may be assigned one or more particular quality of service parameters). This network and network device conditions may also be used to determine the appropriate quality of service parameter settings. At block 470, the service and/or traffic may be provided for the requesting device, in an embodiment, according to the quality of service parameters and other configurations established at block 460. If, at block 450, it is determined that the request service is not to be provided, the request for the service is rejected, which may include transmitting a rejection notification to the requesting device.

In an embodiment, at block 450, when a network device, such as a PDN GW or MME, detects an overload condition or a potential overload condition, or is otherwise informed of such a condition or potential condition, for example by receiving an alarm or other indication of such a condition from another network element, including receiving any of the data received at block 440, the network device may disallow additional signaling and/or traffic for the affected service. For example, if data received at block 440 indicates that a link to an IMS approaches, meets, or exceeds a threshold of utilization, a PDN GW may disallow or reject requests for service from or traffic to the IMS. Alternatively, a PDN GW may instruct all or a group of network devices to reject all requests for service from or traffic to the IMS. In another alternative, particular services for an IMS may be disallowed. For example, one or more of presence services, instant messaging services, VoIP, or non-VoIP services may be disallowed. Alternatively, or in addition, all IMS-capable devices or a subset of IMS devices may be prohibited from connecting and utilizing IMS services. When conditions return to normal, the network device may resume allowing the provision and/or facilitation of IMS services.

Traditionally in an LTE network configured with an EPC and an IMS, network admission control and congestion management may be handled at the eNode-B, and policy control functionality may reside in a PCRF node in the EPC. Current implementations do not provide for a method to disallow or reject a new bearer request based on whether the bearer request is for an IMS-based service. In an embodiment of the present disclosure, this functionality may be implemented within the IMS domain itself, which may reside at the application layer. In such an embodiment, an eNode-B and an MME may communicate with an HSS to acquire and communicate network overload and/or congestion conditions. The HSS may relay network overload and/or congestion data to a call session control function (CSCF) or application server in the IMS. When an IMS-registered user mobile device requests an IMS service, the service request may be forwarded the CSCF or application server. Then the CSCF or application server may accept or reject the request.

In an alternate embodiment, traffic management and admission control may be performed in the EPC at the PCRF. Note that the PCRF operates at the transport layer while the IMS domain resides at the application layer. Therefore, in such an embodiment, when an IMS-registered user mobile device requests an IMS service, the service request may be received via a bearer using session initiation protocol (SIP) messaging at a session border controller (SBC) and/or a CSCF. The SBC or CSCF may communicate with a PCRF to determine network congestion and/or condition data. The PCRF may in turn query EPC network elements (e.g., MME, eNode-B, etc.) to determine whether individual network elements are in overload, congested, or experiencing any other adverse conditions. If conditions are not acceptable, the PCRF may instruct the SBC or the CSCF to reject the service request. If conditions are acceptable, the SBC or the CSCF may transmit the service request to the appropriate application server.

The admission management methods and systems described above assist in providing improved customer service, especially when network performance is affected by outages, congestions, or any other event or occurrence that may degrade service provided to a subscriber. By implementing the present disclosure, the user experience may be improved by, rather than providing poor service to a customer, preventing the customer from accessing a service that may be poorly provided and allowing for connection to another service or at another part of a network that may be able to provide better service. Set forth below are further exemplary systems, devices, and components in which aspects of the disclosed admission management may be implemented.

Figure 5:
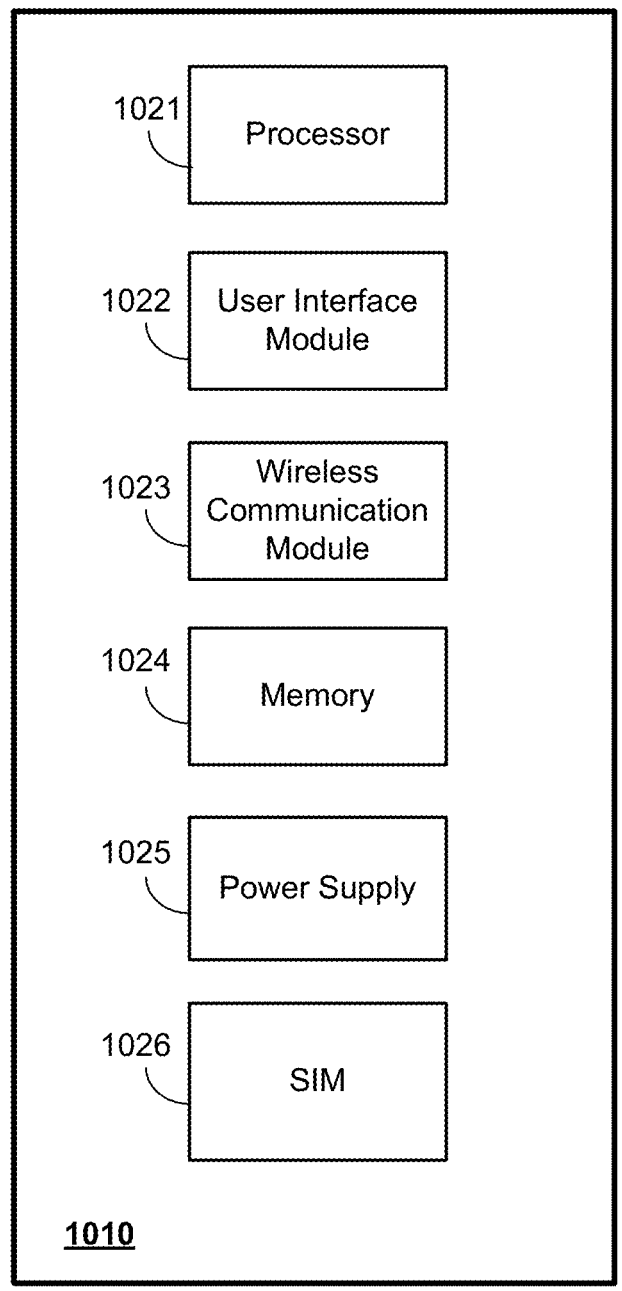
FIG. 5 is a block diagram of a non-limiting exemplary mobile device in which admission management may be implemented.

FIG. 5 illustrates an example wireless device 1010 that may be used in connection with an embodiment. References will also be made to other figures of the present disclosure as appropriate. For example, mobile devices 102, 210, and 310 may be wireless devices of the type described in regard to FIG. 5, and may have some, all, or none of the components and modules described in regard to FIG. 5. It will be appreciated that the components and modules of wireless device 1010 illustrated in FIG. 5 are illustrative, and that any number and type of components and/or modules may be present in wireless device 1010. In addition, the functions performed by any or all of the components and modules illustrated in FIG. 5 may be performed by any number of physical components. Thus, it is possible that in some embodiments the functionality of more than one component and/or module illustrated in FIG. 5 may be performed by any number or types of hardware and/or software.

Processor 1021 may be any type of circuitry that performs operations on behalf of wireless device 1010. In one embodiment, processor 1021 executes software (i.e., computer-readable instructions stored on a tangible computer-readable medium) that may include functionality related to admission management, for example. User interface module 1022 may be any type or combination of hardware and/or software that enables a user to operate and interact with wireless device 1010, and, in one embodiment, to interact with a system or software enabling the user to place, request, and/or receive calls, text communications of any type, voicemail, voicemail notifications, voicemail content and/or data, charging and/or billing data, and/or a system or software enabling the user to view, modify, or delete related software objects. For example, user interface module 1022 may include a display, physical and/or "soft" keys, voice recognition software, a microphone, a speaker and the like. Wireless communication module 1023 may be any type of transceiver including any combination of hardware and/or software that enables wireless device 1010 to communicate with wireless network equipment. Memory 1024 enables wireless device 1010 to store information, such as APNs, MNCs, MCCs, text communications content and associated data, multimedia content, software to efficiently process radio resource requests and service requests, and radio resource request processing preferences and configurations. Memory 1024 may take any form, such as internal random access memory (RAM), an SD card, a microSD card and the like. Power supply 1025 may be a battery or other type of power input (e.g., a charging cable that is connected to an electrical outlet, etc.) that is capable of powering wireless device 1010. SIM 1026 may be any type Subscriber Identity Module and may be configured on a removable or non-removable SIM card that allows wireless device 1010 to store data on SIM 1026.

Figure 6:
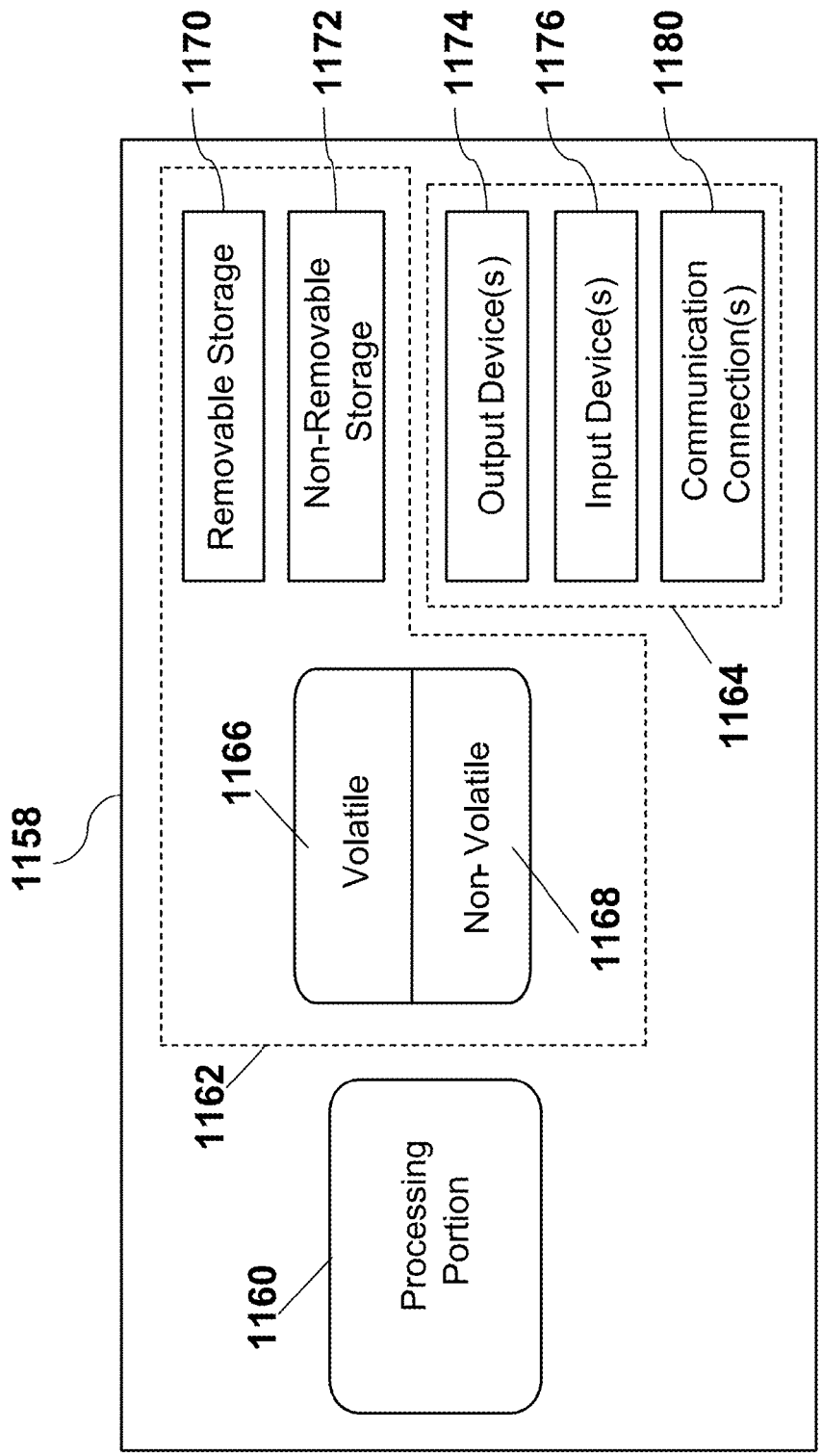
FIG. 6 is a block diagram of a non-limiting exemplary processor in which admission management may be implemented.

FIG. 6 is a block diagram of an example processor 1158 which may be employed in any of the embodiments described herein, including as one or more components of mobile devices 102, 210, and 310, as one or more components of network equipment such as eNode-Bs 220 and 320, MME 230, PDN gateway 330, any other component of networks 106, 108, 110, 112, 201, 301, and 340, and/or any related equipment, and/or as one or more components of any third party system or subsystem that may implement any portion of the subject matter described herein. It is emphasized that the block diagram depicted in FIG. 6 is exemplary and not intended to imply a specific implementation. Thus, the processor 1158 can be implemented in a single processor or multiple processors. Multiple processors can be distributed or centrally located. Multiple processors can communicate wirelessly, via hard wire, or a combination thereof.

As depicted in FIG. 6, the processor 1158 comprises a processing portion 1160, a memory portion 1162, and an input/output portion 1164. The processing portion 1160, memory portion 1162, and input/output portion 1164 are coupled together (coupling not shown in FIG. 6) to allow communications between these portions. The input/output portion 1164 is capable of providing and/or receiving components, commands, and/or instructions, utilized to, for example, transmit and/or receive configuration data, transmit and receive device condition data, establish and terminate communications sessions, transmit and receive service requests and data access request data and responses, transmit, receive, store and process text, data, and voice communications, execute software that efficiently processes radio resource requests, receive and store service requests and radio resource requests, radio resource request processing preferences and configurations, and/or perform any other function described herein.

The processor 1158 may be implemented as a client processor and/or a server processor. In a basic configuration, the processor 1158 may include at least one processing portion 1160 and memory portion 1162. The memory portion 1162 can store any information utilized in conjunction with establishing, transmitting, receiving, and/or processing text, data, and/or voice communications, communications-related data and/or content, voice calls, other telephonic communications, etc. For example, the memory portion is capable of storing APNs, MNCs, MCCs, service requests, radio resource requests, QoS and/or APN parameters, software for admission management, device and link status, condition, and congestion data, text and data communications, calls, voicemail, multimedia content, visual voicemail applications, etc. Depending upon the exact configuration and type of processor, the memory portion 1162 can be volatile (such as RAM) 1166, non-volatile (such as ROM, flash memory, etc.) 1168, or a combination thereof. The processor 1158 can have additional features/functionality. For example, the processor 1158 may include additional storage (removable storage 1170 and/or non-removable storage 1172) including, but not limited to, magnetic or optical disks, tape, flash, smart cards or a combination thereof. Computer storage media, such as memory and storage elements 1162, 1170, 1172, 1166, and 1168, may be tangible storage media that may include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium that can be used to store the desired information and that can be accessed by the processor 1158. Any such computer storage media may be part of the processor 1158.

The processor 1158 may also contain the communications connection(s) 1180 that allow the processor 1158 to communicate with other devices, for example through a radio access network (RAN). Communications connection(s) 1180 is an example of communication media. Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection as might be used with a land line telephone, and wireless media such as acoustic, RF, infrared, cellular, and other wireless media. The term computer-readable media as used herein may include both storage media and communication media. The processor 1158 also may have input device(s) 1176 such as keyboard, keypad, mouse, pen, voice input device, touch input device, etc. Output device(s) 1174 such as a display, speakers, printer, etc. also may be included.

A RAN as described herein may comprise any telephony radio network, or any other type of communications network, wireline or wireless, or any combination thereof. The following description sets forth some exemplary telephony radio networks, such as the global system for mobile communications (GSM), and non-limiting operating environments. The below-described operating environments should be considered non-exhaustive, however, and thus the below-described network architectures merely show how admission management may be implemented with stationary and non-stationary network structures and architectures in order to manage admission to a network. It will be appreciated, however, that admission management as described herein may be incorporated with existing and/or future alternative architectures for communication networks as well.

The GSM is one of the most widely utilized wireless access systems in today's fast growing communication environment. The GSM provides circuit-switched data services to subscribers, such as mobile telephone or computer users. The General Packet Radio Service (GPRS), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

The exemplary GSM/GPRS environment and services described herein also may be extended to 3G services, such as Universal Mobile Telephone System (UMTS), Frequency Division Duplexing (FDD) and Time Division Duplexing (TDD), High Speed Packet Data Access (HSPDA), cdma2000 1x Evolution Data Optimized (EVDO), Code Division Multiple Access-2000 (cdma2000 3x), Time Division Synchronous Code Division Multiple Access (TD-SCDMA), Wideband Code Division Multiple Access (WCDMA), Enhanced Data GSM Environment (EDGE), International Mobile Telecommunications-2000 (IMT-2000), Digital Enhanced Cordless Telecommunications (DECT), 4G Services such as Long Term Evolution (LTE), LTE-Advanced. etc., as well as to other network services that become available in time. In this regard, admission management may be implemented independently of the method of data transport and does not depend on any particular network architecture or underlying protocols.

Figure 7:
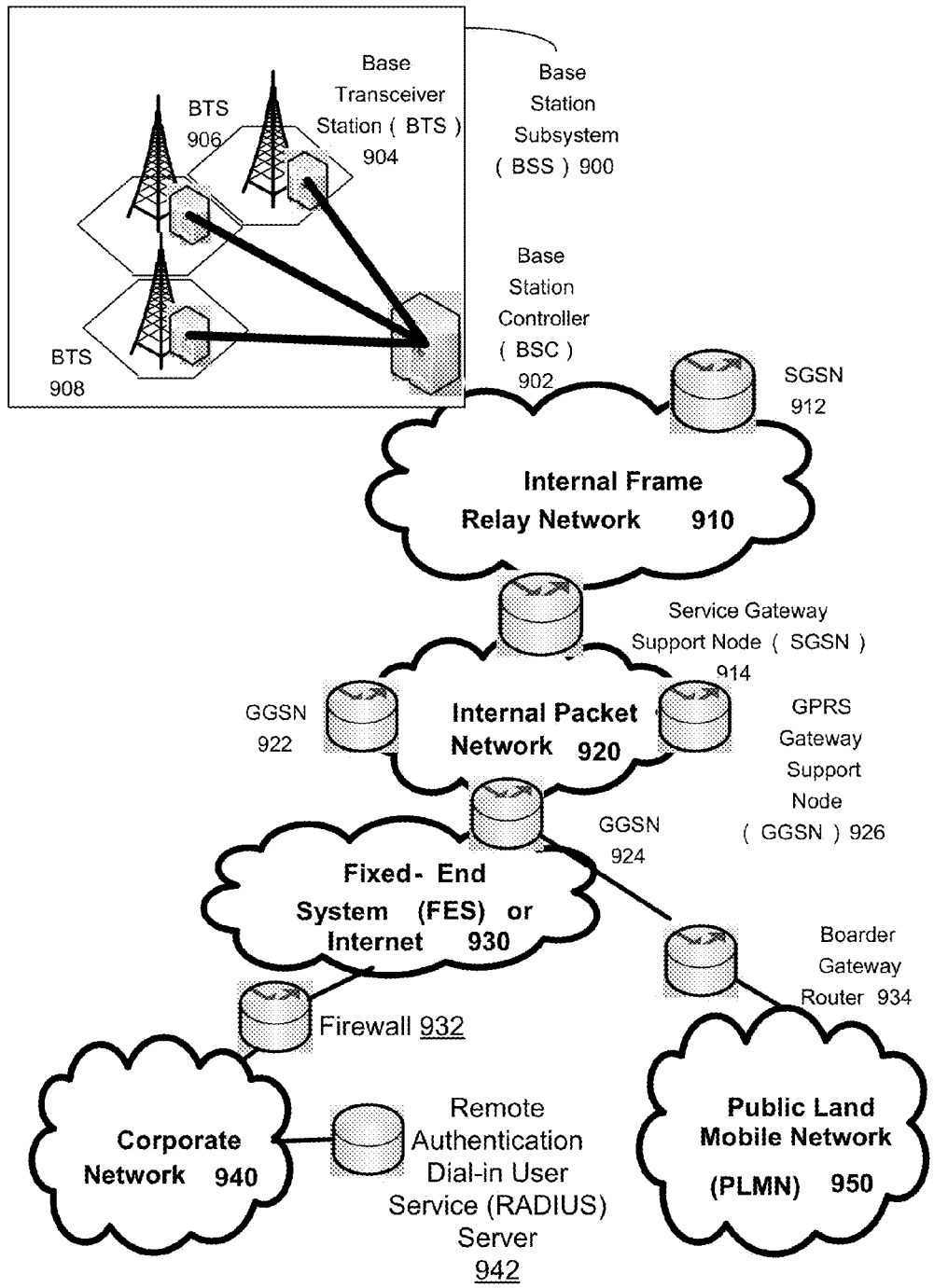
FIG. 7 is a block diagram of a non-limiting exemplary packet-based mobile cellular network environment, such as a GPRS network, in which admission management may be implemented.

FIG. 7 depicts an overall block diagram of an exemplary packet-based mobile cellular network environment, such as a GPRS network, in which admission management systems and methods such as those described herein may be practiced. In an example configuration, any RAN as described herein may be encompassed by or interact with the network environment depicted in FIG. 7. Similarly, mobile devices 102, 210, and 310 may communicate or interact with a network environment such as that depicted in FIG. 7. In such an environment, there may be a plurality of Base Station Subsystems (BSS) 900 (only one is shown), each of which comprises a Base Station Controller (BSC) 902 serving a plurality of Base Transceiver Stations (BTS) such as BTSs 904, 906, and 908. BTSs 904, 906, 908, etc. are the access points where users of packet-based mobile devices (e.g., mobile devices 102, 210, and 310) become connected to the wireless network. In exemplary fashion, the packet traffic originating from user devices (e.g., mobile devices 102, 210, and 310) may be transported via an over-the-air interface to a BTS 908, and from the BTS 908 to the BSC 902. Base station subsystems, such as BSS 900, may be a part of internal frame relay network 910 that can include Service GPRS Support Nodes (SGSN) such as SGSN 912 and 914. Each SGSN may be connected to an internal packet network 920 through which a SGSN 912, 914, etc., may route data packets to and from a plurality of gateway GPRS support nodes (GGSN) 922, 924, 926, etc. As illustrated, SGSN 914 and GGSNs 922, 924, and 926 may be part of internal packet network 920. Gateway GPRS serving nodes 922, 924 and 926 may provide an interface to external Internet Protocol (IP) networks, such as Public Land Mobile Network (PLMN) 950, corporate intranets 940, or Fixed-End System (FES) or the public Internet 930. As illustrated, subscriber corporate network 940 may be connected to GGSN 924 via firewall 932, and PLMN 950 may be connected to GGSN 924 via border gateway router 934. The Remote Authentication Dial-In User Service (RADIUS) server 942 may be used for caller authentication when a user of a mobile cellular device calls corporate network 940.

Generally, there may be four different cell sizes in a GSM network, referred to as macro, micro, pico, and umbrella cells. The coverage area of each cell is different in different environments. Macro cells may be regarded as cells in which the base station antenna is installed in a mast or a building above average roof top level. Micro cells are cells whose antenna height is under average roof top level. Micro-cells may be typically used in urban areas. Pico cells are small cells having a diameter of a few dozen meters. Pico cells may be used mainly indoors. On the other hand, umbrella cells may be used to cover shadowed regions of smaller cells and fill in gaps in coverage between those cells.

Figure 8:
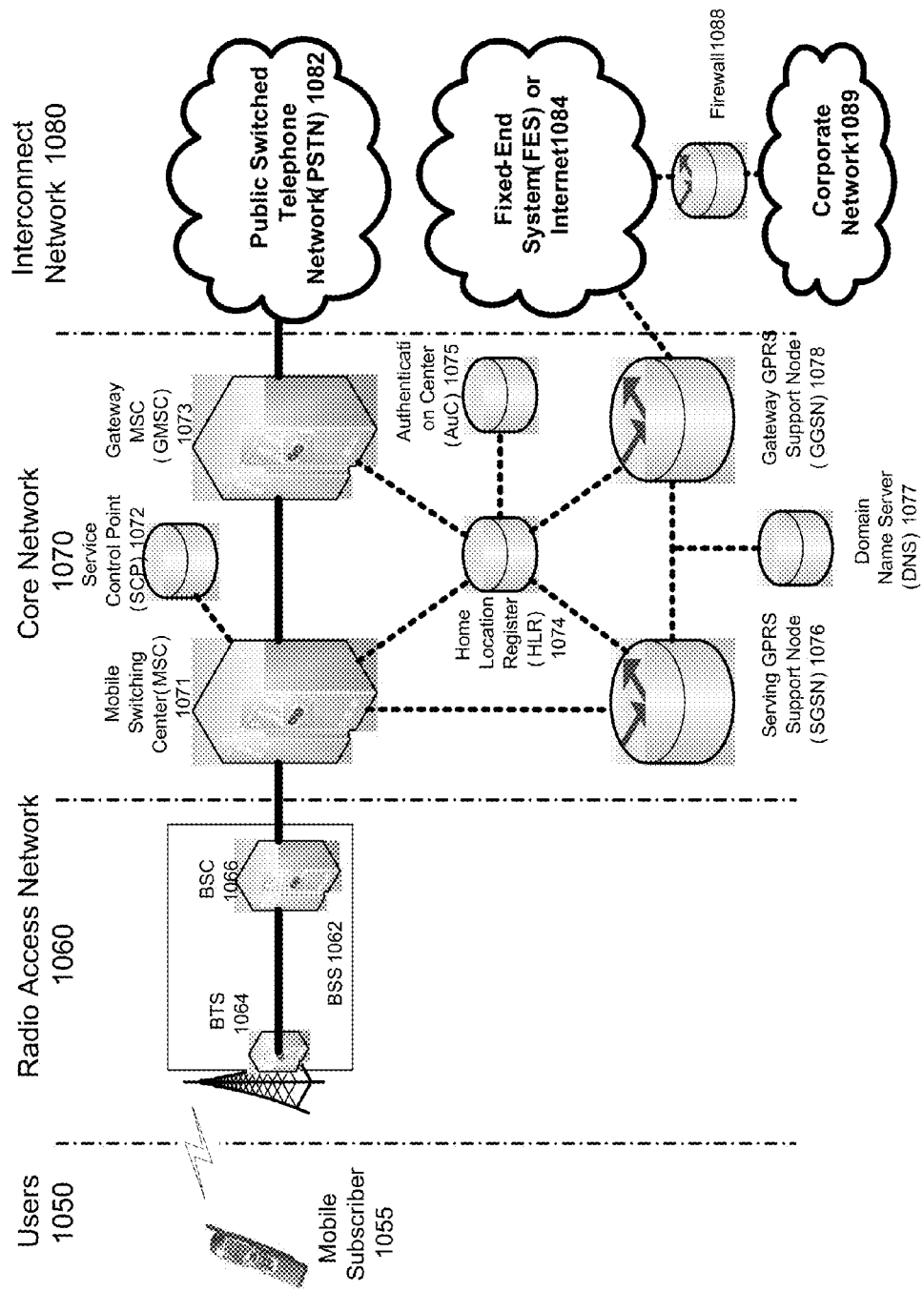
FIG. 8 illustrates a non-limiting exemplary architecture of a typical GPRS network, segmented into four groups, in which admission management may be implemented.

FIG. 8 illustrates an architecture of a typical GPRS network segmented into four groups: users 1050, radio access network 1060, core network 1070, and interconnect network 1080. Users 1050 may comprise a plurality of end users (although only mobile subscriber 1055 is shown in FIG. 8). In an example embodiment, the device depicted as mobile subscriber 1055 may comprise any of mobile devices 102, 210, and 310. Radio access network 1060 comprises a plurality of base station subsystems such as BSSs 1062, which include BTSs 1064 and BSCs 1066. Core network 1070 comprises a host of various network elements. As illustrated here, core network 1070 may comprise Mobile Switching Center (MSC) 1071, Service Control Point (SCP) 1072, gateway MSC 1073, SGSN 1076, Home Location Register (HLR) 1074, Authentication Center (AuC) 1075, Domain Name Server (DNS) 1077, and GGSN 1078. Interconnect network 1080 may also comprise a host of various networks and other network elements. As illustrated in FIG. 8, interconnect network 1080 comprises Public Switched Telephone Network (PSTN) 1082, Fixed-End System (FES) or Internet 1084, firewall 1088, and Corporate Network 1089.

A mobile switching center may be connected to a large number of base station controllers. At MSC 1071, for instance, depending on the type of traffic, the traffic may be separated in that voice may be sent to Public Switched Telephone Network (PSTN) 1082 through Gateway MSC (GMSC) 1073, and/or data may be sent to SGSN 1076 that may send the data traffic to GGSN 1078 for further forwarding.

When MSC 1071 receives call traffic, for example, from BSC 1066, it may send a query to a database hosted by SCP 1072. The SCP 1072 may process the request and may issue a response to MSC 1071 so that it may continue call processing as appropriate.

The HLR 1074 may be a centralized database for users to register to the GPRS network. In some embodiments, any of the devices 220, 241, 242, 243, 244, 250, 310, 320, 420, 441, 442, 443, 444, 450, and 480 may be a device such as HLR 1074. HLR 1074 may store static information about the subscribers such as the International Mobile Subscriber Identity (IMSI), APN profiles, subscribed services, and a key for authenticating the subscriber. HLR 1074 may also store dynamic subscriber information such as dynamic APN profiles and the current location of the mobile subscriber. HLR 1074 may also serve to intercept and determine the validity of destination numbers in messages sent from a device, such as mobile subscriber 1055, as described herein. Associated with HLR 1074 may be AuC 1075. AuC 1075 may be a database that contains the algorithms for authenticating subscribers and may include the associated keys for encryption to safeguard the user input for authentication.

In the following, depending on context, the term "mobile subscriber" sometimes refers to the end user and sometimes to the actual portable device, such as mobile devices 102, 210, and 310, used by an end user of a mobile cellular service or a wireless provider. When a mobile subscriber turns on his or her mobile device, the mobile device may go through an attach process by which the mobile device attaches to an SGSN of the GPRS network. In FIG. 8, when mobile subscriber 1055 initiates the attach process by turning on the network capabilities of the mobile device, an attach request may be sent by mobile subscriber 1055 to SGSN 1076. The SGSN 1076 queries another SGSN, to which mobile subscriber 1055 was attached before, for the identity of mobile subscriber 1055. Upon receiving the identity of mobile subscriber 1055 from the other SGSN, SGSN 1076 may request more information from mobile subscriber 1055. This information may be used to authenticate mobile subscriber 1055 to SGSN 1076 by HLR 1074. Once verified, SGSN 1076 sends a location update to HLR 1074 indicating the change of location to a new SGSN, in this case SGSN 1076. HLR 1074 may notify the old SGSN, to which mobile subscriber 1055 was attached before, to cancel the location process for mobile subscriber 1055. HLR 1074 may then notify SGSN 1076 that the location update has been performed. At this time, SGSN 1076 sends an Attach Accept message to mobile subscriber 1055, which in turn sends an Attach Complete message to SGSN 1076.

After attaching itself to the network, mobile subscriber 1055 may then go through the authentication process. In the authentication process, SGSN 1076 may send the authentication information to HLR 1074, which may send information back to SGSN 1076 based on the user profile that was part of the user's initial setup. The SGSN 1076 may then send a request for authentication and ciphering to mobile subscriber 1055. The mobile subscriber 1055 may use an algorithm to send the user identification (ID) and password to SGSN 1076. The SGSN 1076 may use the same algorithm and compares the result. If a match occurs, SGSN 1076 authenticates mobile subscriber 1055.

Next, the mobile subscriber 1055 may establish a user session with the destination network, corporate network 1089, by going through a Packet Data Protocol (PDP) activation process. Briefly, in the process, mobile subscriber 1055 may request access to an Access Point Name (APN), for example, UPS.com, and SGSN 1076 may receive the activation request from mobile subscriber 1055. SGSN 1076 may then initiate a Domain Name Service (DNS) query to learn which GGSN node has access to the UPS.com APN. The DNS query may be sent to the DNS server within the core network 1070, such as DNS 1077, that may be provisioned to map to one or more GGSN nodes in the core network 1070. Based on the APN, the mapped GGSN 1078 may access the requested corporate network 1089. The SGSN 1076 may then send to GGSN 1078 a Create Packet Data Protocol (PDP) Context Request message that contains necessary information. The GGSN 1078 may send a Create PDP Context Response message to SGSN 1076, which may then send an Activate PDP Context Accept message to mobile subscriber 1055.

Once activated, data packets of the call made by mobile subscriber 1055 may then go through radio access network 1060, core network 1070, and interconnect network 1080, in a particular fixed-end system, or Internet 1084 and firewall 1088, to reach corporate network 1089.

Thus, network elements that can invoke the functionality of admission management systems and methods such as those described herein may include, but are not limited to, Gateway GPRS Support Node tables, Fixed End System router tables, firewall systems, VPN tunnels, and any number of other network elements as required by the particular digital network.

Figure 9:
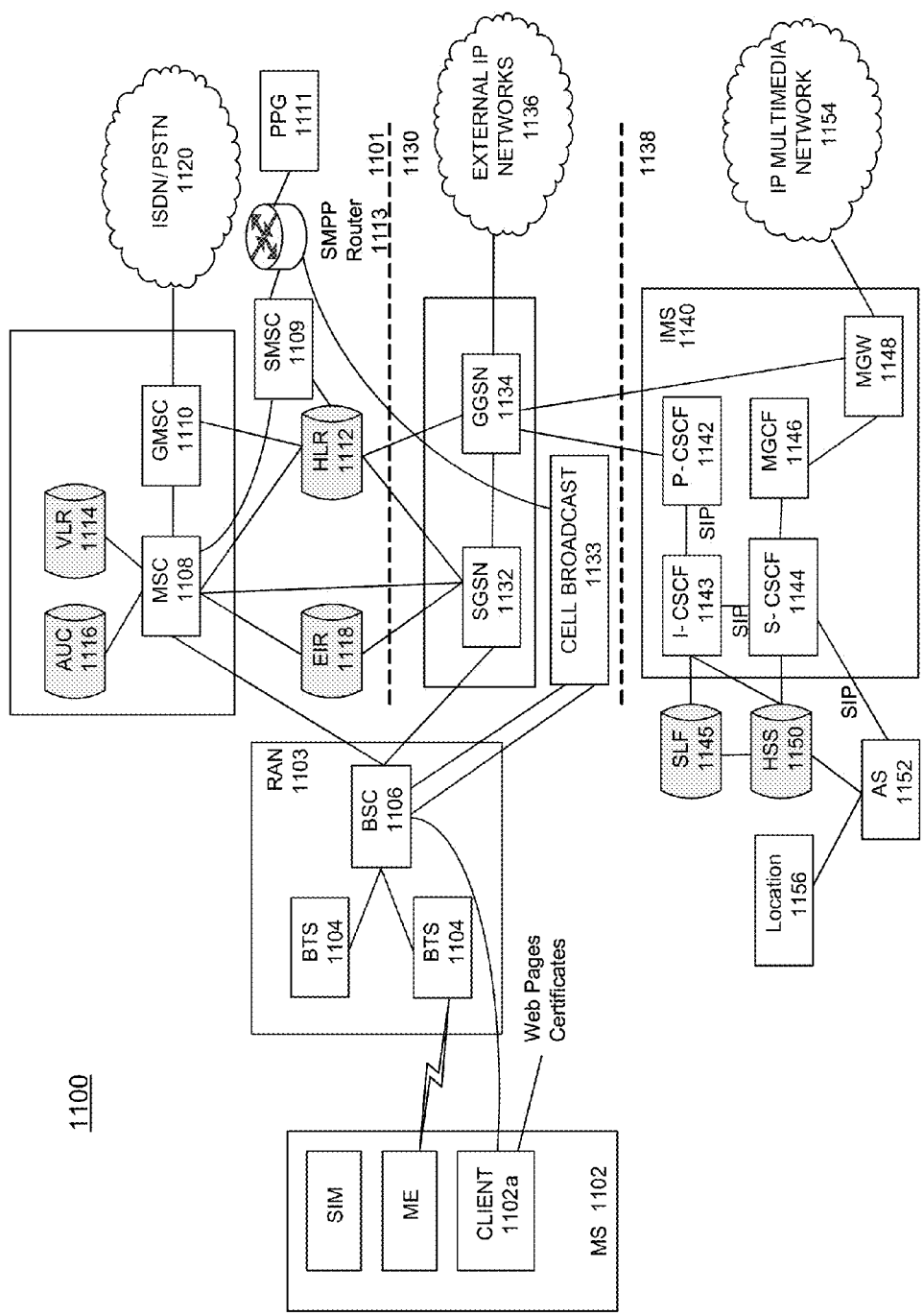
FIG. 9 illustrates a non-limiting alternate block diagram of an exemplary GSM/GPRS/IP multimedia network architecture in which admission management may be implemented.

FIG. 9 illustrates another exemplary block diagram view of a GSM/GPRS/IP multimedia network architecture 1100 in which the systems and methods for admission management such as those described herein may be incorporated. As illustrated, architecture 1100 of FIG. 9 includes a GSM core network 1101, a GPRS network 1130 and an IP multimedia network 1138. The GSM core network 1101 includes a Mobile Station (MS) 1102, at least one Base Transceiver Station (BTS) 1104 and a Base Station Controller (BSC) 1106. The MS 1102 is physical equipment or Mobile Equipment (ME), such as a mobile telephone or a laptop computer (e.g., mobile devices 102, 210, and 310) that is used by mobile subscribers, in one embodiment with a Subscriber identity Module (SIM). The SIM may include an International Mobile Subscriber Identity (IMSI), which may be a unique identifier of a subscriber. The SIM may also include APNs. The BTS 1104 may be physical equipment, such as a radio tower, that enables a radio interface to communicate with the MS. Each BTS may serve more than one MS. The BSC 1106 may manage radio resources, including the BTS. The BSC may be connected to several BTSs. The BSC and BTS components, in combination, are generally referred to as a base station (BSS) or radio access network (RAN) 1103.

The GSM core network 1101 may also include a Mobile Switching Center (MSC) 1108, a Gateway Mobile Switching Center (GMSC) 1110, a Home Location Register (HLR) 1112, Visitor Location Register (VLR) 1114, an Authentication Center (AuC) 1118, and an Equipment Identity Register (EIR) 1116. The MSC 1108 may perform a switching function for the network. The MSC may also perform other functions, such as registration, authentication, location updating, handovers, and call routing. The GMSC 1110 may provide a gateway between the GSM network and other networks, such as an Integrated Services Digital Network (ISDN) or Public Switched Telephone Networks (PSTNs) 1120. Thus, the GMSC 1110 provides interworking functionality with external networks.

The HLR 1112 may be a database that may contain administrative information regarding each subscriber registered in a corresponding GSM network. Such information may include APNs and APN profiles. The HLR 1112 may also contain the current location of each MS. The VLR 1114 may be a database that contains selected administrative information from the HLR 1112. The VLR may contain information necessary for call control and provision of subscribed services for each MS currently located in a geographical area controlled by the VLR. The HLR 1112 and the VLR 1114, together with the MSC 1108, may provide the call routing and roaming capabilities of GSM. The AuC 1116 may provide the parameters needed for authentication and encryption functions. Such parameters allow verification of a subscriber's identity. The EIR 1118 may store security-sensitive information about the mobile equipment.

A Short Message Service Center (SMSC) 1109 allows one-to-one short message service (SMS), or multimedia message service (MMS), messages to be sent to/from the MS 1102. A Push Proxy Gateway (PPG) 1111 is used to "push" (i.e., send without a synchronous request) content to the MS 1102. The PPG 1111 acts as a proxy between wired and wireless networks to facilitate pushing of data to the MS 1102. A Short Message Peer to Peer (SMPP) protocol router 1113 may be provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as voice, data, short message service (SMS), and multimedia message service (MMS), the MS may first register with the network to indicate its current location by performing a location update and IMSI attach procedure. MS 1102 may send a location update including its current location information to the MSC/VLR, via BTS 1104 and BSC 1106. The location information may then be sent to the MS's HLR. The HLR may be updated with the location information received from the MSC/VLR. The location update may also be performed when the MS moves to a new location area. Typically, the location update may be periodically performed to update the database as location updating events occur.

GPRS network 1130 may be logically implemented on the GSM core network architecture by introducing two packet-switching network nodes, a serving GPRS support node (SGSN) 1132, a cell broadcast and a Gateway GPRS support node (GGSN) 1134. The SGSN 1132 may be at the same hierarchical level as the MSC 1108 in the GSM network. The SGSN may control the connection between the GPRS network and the MS 1102. The SGSN may also keep track of individual MS's locations and security functions and access controls.

Cell Broadcast Center (CBC) 1133 may communicate cell broadcast messages that are typically delivered to multiple users in a specified area. Cell Broadcast is one-to-many geographically focused service. It enables messages to be communicated to multiple mobile telephone customers who are located within a given part of its network coverage area at the time the message is broadcast.

GGSN 1134 may provide a gateway between the GPRS network and a public packet network (PDN) or other IP networks 1136. That is, the GGSN may provide interworking functionality with external networks, and set up a logical link to the MS through the SGSN. When packet-switched data leaves the GPRS network, it may be transferred to an external TCP-IP network 1136, such as an X.25 network or the Internet. In order to access GPRS services, the MS first attaches itself to the GPRS network by performing an attach procedure. The MS may then activate a packet data protocol (PDP) context, thus activating a packet communication session between the MS, the SGSN, and the GGSN.

In a GSM/GPRS network, GPRS services and GSM services may be used in parallel. The MS may operate in one three classes: class A, class B, and class C. A class A MS may attach to the network for both GPRS services and GSM services simultaneously. A class A MS may also support simultaneous operation of GPRS services and GSM services. For example, class A mobiles may receive GSM voice/data/SMS calls and GPRS data calls at the same time.

A class B MS may attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

GPRS network 1130 may be designed to operate in three network operation modes (NOM1, NOM2 and NOM3). A network operation mode of a GPRS network may be indicated by a parameter in system information messages transmitted within a cell. The system information messages may direct an MS where to listen for paging messages and how to signal towards the network. The network operation mode represents the capabilities of the GPRS network. In a NOM1 network, a MS may receive pages from a circuit switched domain (voice call) when engaged in a data call. The MS may suspend the data call or take both simultaneously, depending on the ability of the MS. In a NOM2 network, a MS may not receive pages from a circuit switched domain when engaged in a data call, since the MS may be receiving data and may not be listening to a paging channel. In a NOM3 network, a MS may monitor pages for a circuit switched network while receiving data and vice versa.

The IP multimedia network 1138 was introduced with 3GPP Release 5, and may include IP multimedia subsystem (IMS) 1140 to provide rich multimedia services to end users. A representative set of the network entities within IMS 1140 are a call/session control function (CSCF), a media gateway control function (MGCF) 1146, a media gateway (MGW) 1148, and a master subscriber database, called a home subscriber server (HSS) 1150. HSS 1150 may be common to GSM core network 1101, GPRS network 1130 as well as IP multimedia network 1138.

IP multimedia system 1140 may be built around the call/session control function, of which there are three types: an interrogating CSCF (I-CSCF) 1143, a proxy CSCF (P-CSCF) 1142, and a serving CSCF (S-CSCF) 1144. The P-CSCF 1142 is the MS's first point of contact with the IMS 1140. The P-CSCF 1142 may forward session initiation protocol (SIP) messages received from the MS to an SIP server in a home network (and vice versa) of the MS. The P-CSCF 1142 may also modify an outgoing request according to a set of rules defined by the network operator (for example, address analysis and potential modification).

I-CSCF 1143 forms an entrance to a home network and hides the inner topology of the home network from other networks and provides flexibility for selecting an S-CSCF. I-CSCF 1143 may contact subscriber location function (SLF) 1145 to determine which HSS 1150 to use for the particular subscriber, if multiple HSSs 1150 are present. S-CSCF 1144 may perform the session control services for MS 1102. This includes routing originating sessions to external networks and routing terminating sessions to visited networks. S-CSCF 1144 may also decide whether an application server (AS) 1152 is required to receive information on an incoming SIP session request to ensure appropriate service handling. This decision may be based on information received from HSS 1150 (or other sources, such as application server 1152). AS 1152 may also communicate to location server 1156 (e.g., a Gateway Mobile Location Center (GMLC)) that provides a position (e.g., latitude/longitude coordinates) of MS 1102.

HSS 1150 may contain a subscriber profile and keep track of which core network node is currently handling the subscriber. It may also support subscriber authentication and authorization functions (AAA). In networks with more than one HSS 1150, a subscriber location function provides information on the HSS 1150 that contains the profile of a given subscriber.

MGCF 1146 may provide interworking functionality between SIP session control signaling from the IMS 1140 and ISUP/BICC call control signaling from the external GSTN networks (not shown.) It may also control the media gateway (MGW) 1148 that provides user-plane interworking functionality (e.g., converting between AMR- and PCM-coded voice.) MGW 1148 may also communicate with other IP multimedia networks 1154.

Push to Talk over Cellular (PoC) capable mobile telephones may register with the wireless network when the telephones are in a predefined area (e.g., job site, etc.) When the mobile telephones leave the area, they may register with the network in their new location as being outside the pre-defined area. This registration, however, does not indicate the actual physical location of the mobile telephones outside the pre-defined area.

While example embodiments of systems and methods for admission management have been described in connection with various communications devices and computing devices and processors, the underlying concepts can be applied to any communications or computing device, processor, or system capable of implementing the admission management systems and methods described. The various techniques described herein may be implemented in connection with hardware or software or, where appropriate, with a combination of both. Thus, the methods and apparatuses for admission management, or certain aspects or portions thereof, can take the form of program code (i.e., instructions) embodied in tangible and/or other media that is not a signal, such as floppy diskettes, CD-ROMs, hard drives, or any other machine-readable storage medium, wherein, when the program code is loaded into and executed by a machine, such as a computer, the machine becomes an apparatus for admission management. In the case of program code execution on programmable computers, the computing device may include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

Methods and systems for admission management may also be practiced via communications embodied in the form of program code that may be transmitted over some transmission medium, such as over electrical wiring or cabling, through fiber optics, or via any other form of transmission, wherein, when the program code is received, loaded into, and executed by a machine, such as an EPROM, a gate array, a programmable logic device (PLD), a client computer, or the like, the machine becomes an apparatus for admission management. When implemented on a general-purpose processor, the program code combines with the processor to provide a unique apparatus that operates to invoke the functionality of admission management as described herein. Additionally, any storage techniques used in connection with an admission management system may be a combination of hardware and software.

While admission management systems and methods have been described in connection with the various embodiments of the various figures, it is to be understood that other similar embodiments may be used or modifications and additions may be made to the described embodiments for performing the same function of admission management without deviating therefrom. For example, one skilled in the art will recognize admission management as described in the present application may apply to any environment, whether wired or wireless, and may be applied to any number of such devices connected via a communications network and interacting across the network. Therefore, admission management should not be limited to any single embodiment, but rather should be construed in breadth and scope in accordance with the appended claims.

What is claimed is:

1. A method comprising:
receiving, at a network device within a network, an operational status of an Internet Protocol (IP) multimedia system device in an IP multimedia system, and a status of a link to the Internet;
receiving, at the network device, a request from a mobile device for access to the network;
determining at the network device whether the request is an IMS request or an internet traffic request;
if the request is an IMS request, then determining, at the network device based on at least one of an operational status, congestion, or a device condition, for each network connection to be utilized to fulfill the request, whether utilization of the IP multimedia system device has exceeded a threshold;
responsive to determining whether the utilization of the IP multimedia system device has exceeded the threshold, transmitting a response to the request from the network device to the mobile device;
if the request is an internet traffic request then determining whether a link to the internet has exceeded an internet congestion threshold; and responsive to determining whether the link to the internet has exceeded the internet congestion threshold transmitting a response to the request from the network device to the mobile device.

2. The method of claim 1, wherein the determining of whether the utilization of the IP multimedia system device has exceeded the threshold comprises determining that the utilization of the IP multimedia system device has exceeded the threshold, the method further comprising transmitting an instruction to a second network device to prohibit access, by the mobile device, to the IP multimedia system.

3. The method of claim 1, wherein the determining of whether the utilization of the IP multimedia system device has exceeded the threshold comprises determining that the utilization of the IP multimedia system device has not exceeded the threshold, the method further comprising transmitting an instruction to a second network device to allow access, by the mobile device, to the IP multimedia system.

4. The method of claim 1, further comprising determining network resources that will allow the mobile device access to the IP multimedia system based on the request.

5. The method of claim 1, wherein the receiving of the request from the mobile device for access to the IP multimedia system comprises determining that the mobile device is capable of communicating with a device in the IP multimedia system.

6. The method of claim 1, wherein the network device comprises at least one of a call session control function device, a mobility management entity, a packet data network gateway, or a policy and charging rules function device.

7. The method of claim 1, further comprising determining, based on the operational status of the IP multimedia system device, whether the IP multimedia system device is currently overloaded.

8. A network device comprising:
a transceiver;
a memory comprising instructions; and
a processor, wherein the processor, when executing the instructions, effectuates operations comprising:
  receiving an operational status of an IP multimedia system device and a status of a link to the internet in a network device within a network;
  receiving a request from a mobile device for access to the IP multimedia system network;
  determining at the network device whether the request is an IMS request or an internet traffic request;
  if the request is an IMS request, then determining, at the network device based on at least one of an operational status, congestion, or a device condition, for each network connection to be utilized to fulfill the request, whether utilization of the IP multimedia system device has exceeded a threshold;
  responsive to determining whether the utilization of the IP multimedia system device has exceeded the threshold, transmitting a response to the request to the mobile device;
  if the request is an internet traffic request then determining whether a link to the internet has exceeded an internet congestion threshold; and
  responsive to determining whether the link to the internet has exceeded the internet congestion threshold transmitting a response to the request from the network device to the mobile device.

9. The network device of claim 8, wherein the operation of determining whether the utilization of the IP multimedia system device has exceeded the threshold comprises determining that the utilization of the IP multimedia system device has exceeded the threshold, and wherein the operations further comprise transmitting an instruction to a second network device to prohibit access, by the mobile device, to the IP multimedia system.

10. The network device of claim 8, wherein the operation of determining whether the utilization of the IP multimedia system device has exceeded the threshold comprises determining that the utilization of the IP multimedia system device has not exceeded the threshold, and wherein the operations further comprise transmitting an instruction to a second network device to allow access, by the mobile device, to the IP multimedia system.

11. The network device of claim 8, wherein the operations further comprise determining network resources that will allow the mobile device access to the IP multimedia system based on the request.

12. The network device of claim 8, wherein the operation of receiving the request from the mobile device for access to the IP multimedia system comprises determining that the mobile device is capable of communicating with a device in the IP multimedia system.

13. The network device of claim 8, wherein the network device is at least one of a call session control function device, a mobility management entity, a packet data network gateway, or a policy and a charging rules function device.

14. The network device of claim 8, further comprising the operation of determining, based on the operational status of the IP multimedia system device, whether the IP multimedia system device is currently overloaded.

15. A tangible computer-readable storage medium comprising computer-executable instructions, which when executed by a processor, cause the processor to perform operations comprising:
  accessing information representing an operational status of an IP multimedia system device in an IP multimedia system in a network and a status of a link to the internet in the network;
  receiving a request from a mobile device for access to the network;
  determining at the network device whether the request is an IMS request or an internet traffic request;
  if the request is an IMS request, then determining, at the network device based on at least one of an operational status, congestion, or a device condition, for each network connection to be utilized to fulfill the request, whether utilization of the IP multimedia system device has exceeded a threshold;
  responsive to determining whether the utilization of the IP multimedia system device has exceeded the threshold, transmitting a response to the request to the mobile device;
    if the request is an internet traffic request then determining whether a link to the internet has exceeded an internet congestion threshold; and
    responsive to determining whether the link to the internet has exceeded the internet congestion threshold transmitting a response to the request from the network device to the mobile device.

16. The tangible computer-readable storage medium of claim 15, wherein the operation of determining whether the utilization of the IP multimedia system device has exceeded the threshold comprises determining that the utilization of the IP multimedia system device has exceeded the threshold, and wherein the operations further comprise transmitting an instruction to a second network device to prohibit access, by the mobile device, to the IP multimedia system.

17. The tangible computer-readable storage medium of claim 15, wherein the operation of determining whether the utilization of the IP multimedia system device has exceeded the threshold comprises determining that the utilization of the IP multimedia system device has not exceeded the threshold, and wherein the operations further comprise transmitting an instruction to a second network device to allow access, by the mobile device, to the IP multimedia system.

18. The tangible computer-readable storage medium of claim 15, wherein the operations further comprise determining network resources that will allow the mobile device access to the IP multimedia system based on the request.

19. The tangible computer-readable storage medium of claim 15, wherein the operation of receiving the request from the mobile device for access to the IP multimedia system comprises determining that the mobile device is capable of communicating with a device in the IP multimedia system.

20. The tangible computer-readable storage medium of claim 15, wherein the operations further comprise determining, based on the operational status of the IP multimedia system device, whether the IP multimedia system device is currently overloaded.

\* \* \* \* \*